United States Patent [19]

Douma et al.

[11] Patent Number: 5,338,929
[45] Date of Patent: Aug. 16, 1994

[54] MICROMACHINED SENSOR DEVICE USING A BEAM OF LIGHT WITH A FREQUENCY SWEPT MODULATED INTENSITY TO ACTIVATE AT LEAST TWO RESONANCE MODES OF THE SENSOR ELEMENT

[75] Inventors: Bindert S. Douma; Peter Eigenraam, both of CM Amsterdam, Netherlands

[73] Assignee: Shell Oil Company, Houston, Tex.

[21] Appl. No.: 24,995

[22] Filed: Mar. 2, 1993

[30] Foreign Application Priority Data

Mar. 30, 1992 [EP] European Pat. Off. ......... 92200910.5

[51] Int. Cl.$^5$ .............................................. G01L 1/10
[52] U.S. Cl. ........................... 250/231.1; 250/227.21; 73/862.59
[58] Field of Search ....................... 250/227.11, 227.14, 250/227.18, 227.19, 227.21, 227.23, 227.27, 231.10; 73/651, 655, 657, 777, 778, 800, 862.59

[56] References Cited

U.S. PATENT DOCUMENTS

| 4,972,076 | 11/1990 | Willson | 250/227.21 |
|---|---|---|---|
| 5,085,080 | 4/1992 | Yu | . |
| 5,089,695 | 2/1992 | Willson et al. | 250/227.21 |
| 5,165,289 | 11/1992 | Tilmans | 73/862.59 |

FOREIGN PATENT DOCUMENTS

| 0244086 | 4/1987 | European Pat. Off. . |
| 0371592 | 6/1990 | European Pat. Off. . |
| 2223582A | 4/1990 | United Kingdom . |

OTHER PUBLICATIONS

T. Kvisteroy et al., "Optically Excited Silicon Sensor for Permanently Installed Downhole Pressure Monitoring Applications," *Sensors and Actuators A*, vol. A31, No. 1/3, pp. 164–167 (Mar. 1992).
B. S. Douma et al., "Modelling the Pressure and Temperature Sensitivity of an Optically Excited Micromachined Silicon Sensor for Permanently Installed Downhole Monitoring Systems," *Sensors and Actuators A,* 31, pp. 215–219, Elsevier Sequoia (1992).
Search Report dated Jun. 15, 1993 attached.
Andres, Miguel V., Kenneth W. H. Foulds and M. John Tudor, "Sensitivity and Mode Spectrum of a Frequency-Output Silicon Pressure Sensor," *Sensors and Actuators,* 15, (1988) 417–426.
Uttamchandani, D., K. E. B. Thornton and B. Culshaw, "Optically Excited Resonant Beam Pressure Sensor," *Electronics Letters,* vol. 23, No. 25 (Dec. 1987) pp. 1333-13334.
Vincent, D. R. and J. N. Ross, "An All-optical Single-fibre Micromachined Silicon Resonant Sensor: Towards a Commercial Device," *Sensors and Actuators A,* 25-27 (1991) pp. 209–212.
"Fibre Optic Well Monitoring" Brochure distributed at the "Eurosensors V" Conference, Rome, Italy, Sep. 30–Oct. 2, 1991, by Alcatel Kabel Norge AS, P.O. Box 60, Okern, N-0508 Oslo, Norway.
Douma, B. S., P. Eigenraam and P. Hatlem, Transparencies entitled "Modelling the pressure and temperature sensitivity of an optically excited, micromachined silicon sensor for permanently installed downhole monitoring systems." used at *Proceedings of the Eurosensors V,* Oct. 2, 1991, Rome.
Table of Contents from *Sensors and Actuators A* vols. A31 and A32, Mar. and Apr. 1992, Proceedings from the Eurosensors V, Oct 2, 1991, Rome, Italy.
Holmes, Ian. Letter from Elsevier Sequoia S. A. verifying the date of distribution of vol. A31 of *Sensors and Actuators* dated Mar. 10, 1993.

*Primary Examiner*—David C. Nelms
*Assistant Examiner*—John R. Lee
*Attorney, Agent, or Firm*—Fred S. Reynolds

[57] ABSTRACT

In a method for monitoring strain variations of a strain responsive element of a micromachined sensor device while subjected to outside parameter conditions, at least two oscillation resonance modes of said element are activated and interrogated optically. Thereby correspondingly at least two resonance frequencies are obtained. From parameter/frequency characteristics of said device correspondingly at least two parameter values are derived.

34 Claims, 4 Drawing Sheets

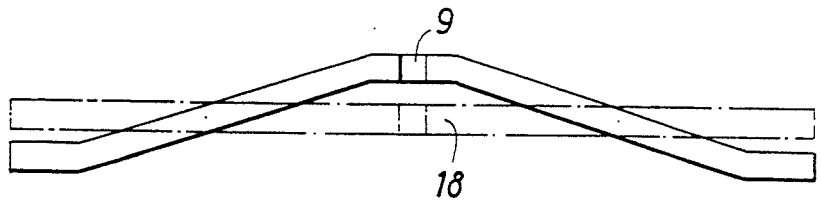
FIG. 3a
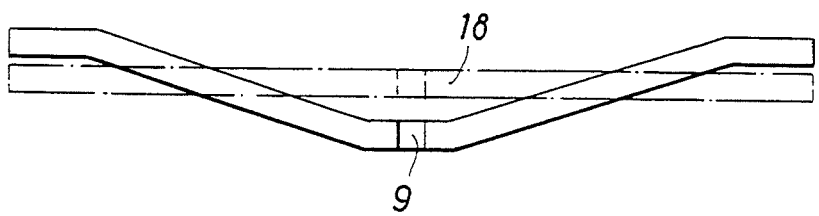
FIG. 3b
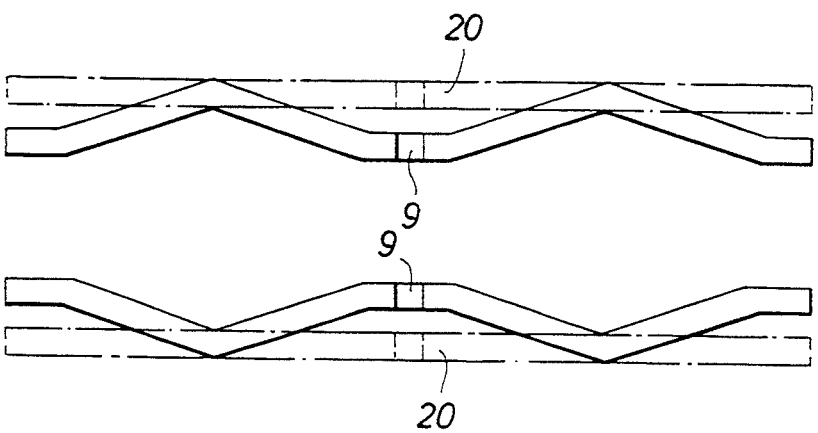
FIG. 3c
FIG. 3d
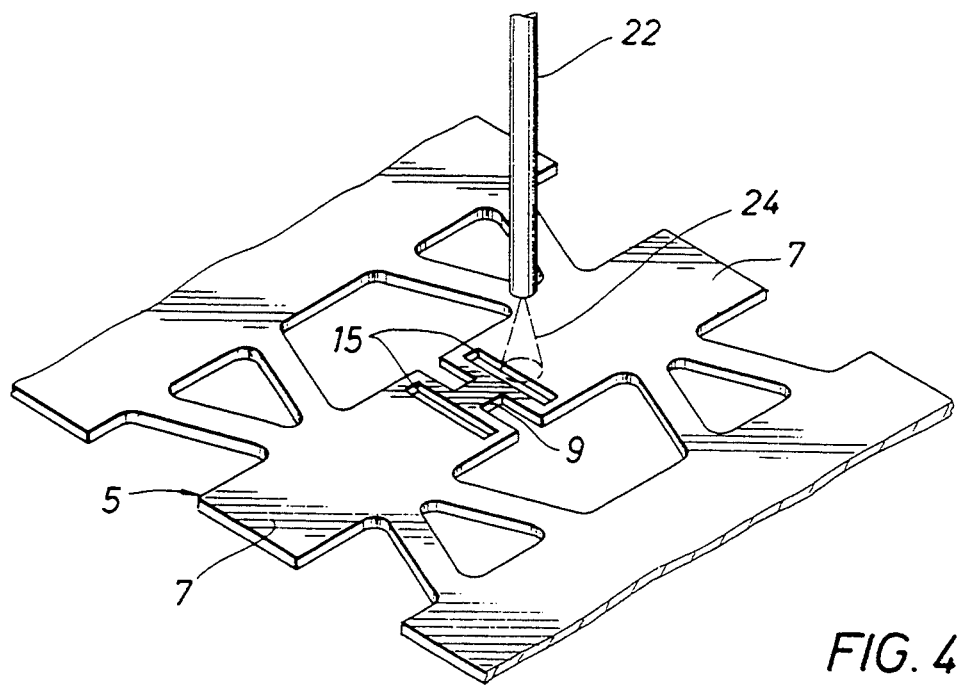
FIG. 4

MICROMACHINED SENSOR DEVICE USING A BEAM OF LIGHT WITH A FREQUENCY SWEPT MODULATED INTENSITY TO ACTIVATE AT LEAST TWO RESONANCE MODES OF THE SENSOR ELEMENT

BACKGROUND OF THE INVENTION

1. Field of the Invention

The present invention relates to a micromachined sensor device for determination of parameters affecting said device. In particular, the present invention relates to a method for monitoring strain variations of a strain responsive element of a micromachined sensor device.

2. Description of Related Art

A method for using a micromachined device is taught in "A pressure responsive device having a resonantly vibrating element in an elastic tube", GB 2 223 582. The method monitors strain variations of a strain responsive element of a micromachined sensor device and comprises the steps of:

(a) irradiating said strain responsive element by a beam of light with at least a frequency swept modulated intensity for activating said element in order to oscillate in a corresponding oscillation resonance mode at its resonance frequency;
(b) determining frequency characteristics of said device when subjected to predefined parameter conditions;
(c) subjecting said element to outside parameter conditions; and
(d) detecting the beam of light after being modified correspondingly by said activated element.

The method of GB 2 223 582 clearly addresses a micromachined pressure responsive device. For example, it is to be used as a "down well" pressure sensor in oil drilling and exploration. Only pressure response is known for this device. In particular, this method teaches that said micromachined sensors are made from single crystal silicon.

In an article by Andres et al., "Sensitivity and mode spectrum of a frequency-output silicon pressure sensor" Sensors and Actuators 15 (1988) pages 417–426, different vibrational modes of a so-called micromachined, butterfly silicon sensor integral with a thin diaphragm are shown. The modes are investigated by activating electrically and interrogating optically. In particular, for said modes, relationships between resonance frequency and pressure are determined. The modes $M_{nm}$ are classified in accordance with position and direction of node-axes.

In an article by Uttamchandani et al., "Optically excited resonant beam pressure sensor", Electronic Letters, 3rd December 1987, Vol. 23, No. 25, pages 1333–1334, resonance frequency/pressure and resonance frequency/temperature relationships for the fundamental mode of vibration of a beam-type micromachined silicon resonator are determined. No further interrelationships or dependencies are shown.

Moreover, from the above documents, the usual way of driving such resonators and detecting resonance frequencies by optical activation/interrogation techniques is known. In particular, two light sources, i.e., a pulsed mode source for activation and a continuous-wave source for interrogation are employed. Light transmitted by said sources is joined and guided in one fiber to the sensor, thus avoiding complex instrumental arrangements at the measuring position.

Whereas from the above advantageous use of one single fiber for activation and interrogation of the vibrational modes of such sensors, only a determination of the corresponding one parameter responsible for operation conditions, as mentioned, is realized.

However, in most cases, it is necessary to determine a set of parameters to qualify accurately working conditions in hostile environmental situations. For example, in the above mentioned downhole circumstances, exploration and production activities should be carried out at operation conditions as safe as possible. Especially pressure/temperature combinations should be monitored closely and reliably. Moreover, with respect to production activities, permanently installed sensor devices have to be used for long time periods.

To remedy the shortcomings, as addressed above, several solutions are proposed For example in the article by Vincent et al "An All-optical Single-fibre Micromachined Silicon Resonant Sensor: Towards a Commercial Device", Sensors and Actuators A, 25–27 (1991), pages 209–212, both the use of a set of sensors, called multiplexing sensors, with different resonance frequencies, and mechanical temperature compensation are disclosed.

A further compensation method is shown in "Sensors using Vibrating Elements" EP 371 592. Also, one fiber communication linkage is applied in this reference. The sensor device shown comprises a couple of strain responsive silicon beams, with one being affected by both pressure and temperature variations, the other having a free end only being subjected to temperature variations. Thus temperature corrections can be made.

However, the solutions and options as presented in the documents discussed, either seem to represent only a device development stage, or employ multicomponent sensor devices and related complex or incomplete parameter monitoring programs.

SUMMARY OF THE INVENTION

It is a main object of the present invention to present a method capable of determining a set of outside parameters by means of a single micromachined sensor device in a reliable and accurate way.

It is a further object of the invention to determine said outside parameters in only one frequency sweep.

The invention includes a method for monitoring strain variations of a strain responsive element of a micromachined sensor device, the method comprising the steps of:

(a) irradiating said element by a beam of light with at least frequency swept modulated intensity for activating said element such that at least two oscillation resonate modes are activated subsequently at their resonance frequencies;
(b) determining frequency characteristics of said device when subjected to predefined parameter conditions by measuring the corresponding resonate frequencies of two said resonate modes at said predefined parameter conditions;
(c) determining correspondingly two parameter values for said device by fitting the measured resonate frequencies upon the corresponding frequency characteristics;
(d) subjecting said element to outside parameter conditions; and (e) detecting the beam of light after being modified correspondingly by said activated element.

Furthermore, the invention also includes an apparatus for monitoring outside parameter conditions, the apparatus comprising:
a micromachined sensor device having a strain responsive element, said strain responsive element responding to strain variations resulting from the varying outside parameter conditions;
a light beam supply means functional for irradiating said element with light;
a frequency oscillator means functional for generating a beam of light with frequency swept modulated intensity in order to activate said element in at least two oscillation resonance modes at their resonance frequencies, whereby the oscillator means supplies the beam supply means with an intensity modulated light beam;
detecting means functional for detecting a modified beam of light, said modified beam being light modified by said activated element;
measuring means functional for measuring the resonance frequencies from said modified beam; and
processing means functional for processing resonance frequency values and deriving therefrom at least correspondingly two outside parameter values.

These and other objects and advantages of the present invention will no doubt become apparent to those of skill in the art after having read the following detailed description of the preferred embodiments which are contained herein and illustrated by the various figures.

The invention encompasses the heretofore described preferred embodiments as well as other embodiments as are described hereinafter and as will be apparent to those of skill in the art.

BRIEF DESCRIPTION OF THE DRAWINGS

The present invention will now be described by way of example in more detail with reference to the accompanying drawing, wherein

FIGS. 3a and 3b show side cross sectional views of the butterfly sensor of FIG. 2, the views showing the approximate vibrational shape of the butterfly actuated in a $M_{02}$ mode.

FIGS. 3c and 3d show side cross sectional views of the butterfly sensor of FIG. 2, the views showing the approximate vibrational shape of the butterfly actuated in $M_{04}$ mode.

FIG. 4 is a perspective view of the butterfly sensor being actuated by optical energy from a fiber optical cable.

DESCRIPTION OF THE EMBODIMENTS

Figure 1:
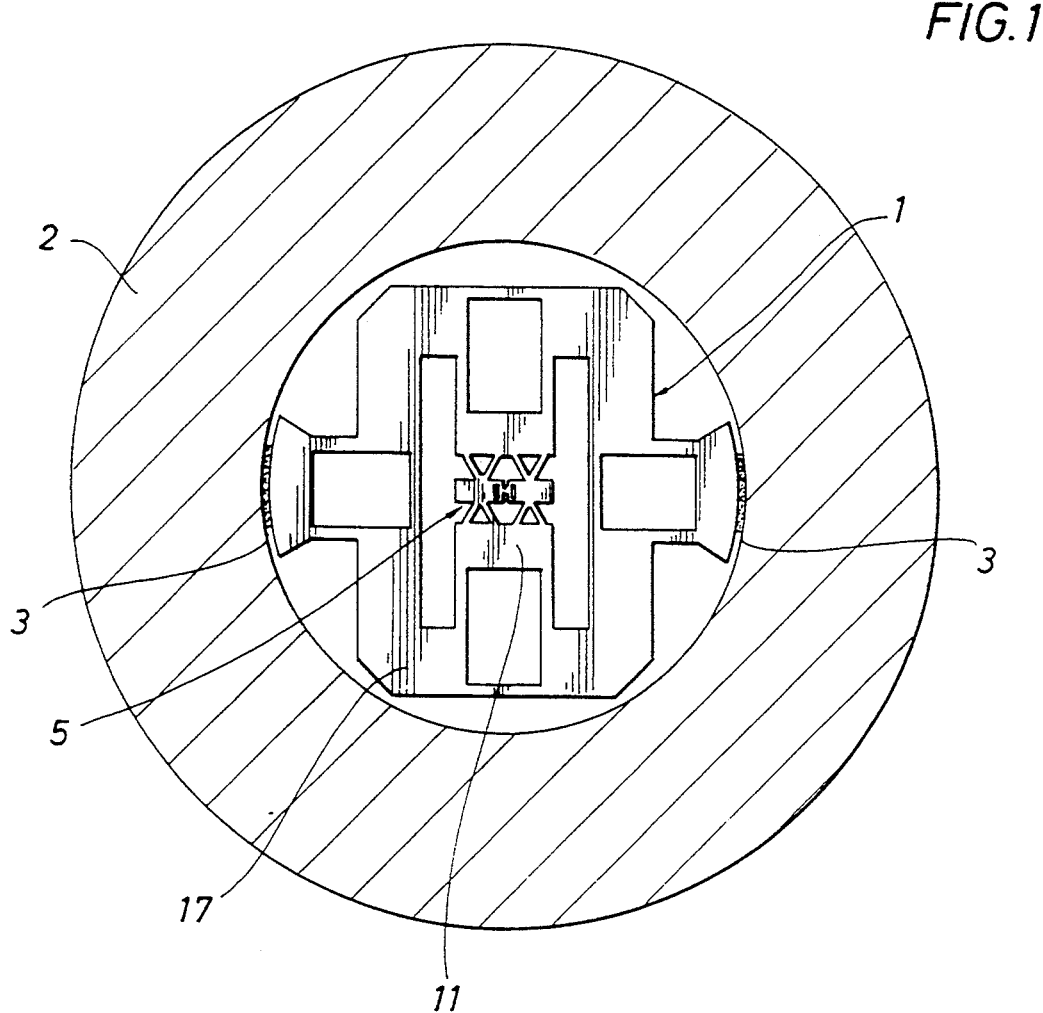
FIG. 1 shows a top view of a micromachined sensor device within a measuring tube, the sensor device including a butterfly sensor.

Referring to FIG. 1 a micromachined sensor means 1 is mounted within a tubular housing 2 shown in a cross-sectional view. Said housing is subjected to outside parameter variations and conditions to be monitored and sensed by said sensor device.

Sensor device 1, of which a top view is shown, has the form of a thin plate and is mounted within and connected to the housing 2 by means of frits 3 of which by way of example two are shown. Sensor means I comprises a so-called butterfly sensor 5.

Figure 2:
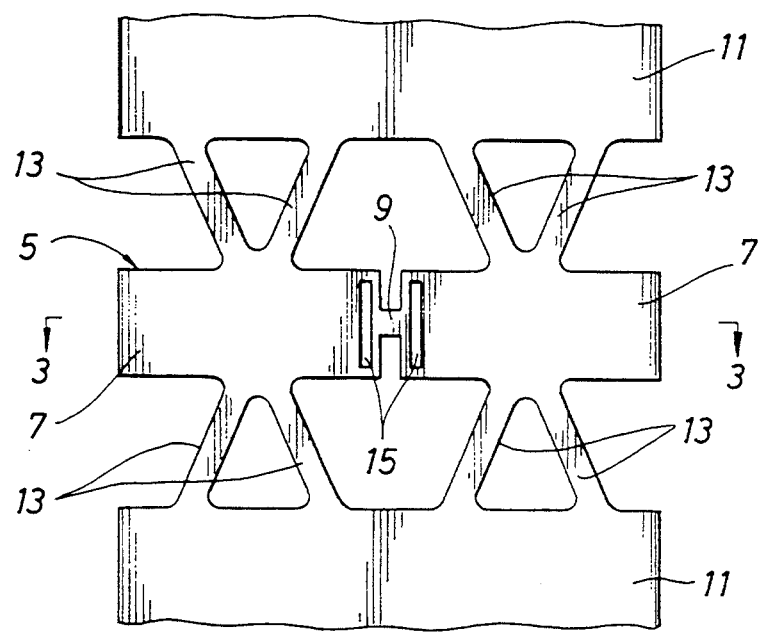
FIG. 2 shows an enlarged top view of the butterfly sensor of FIG. 1.

Now referring to FIG. 2, an enlarged view of butterfly sensor 5 is provided. Said sensor 5 generally comprises two rectangular paddles 7 arranged in line and at their mutually facing short sides connected to each other by means of a hinge 9. Each paddle 7 is at its two long sides coupled to a support means 11 by means of at least corresponding two string means 13. Paddles 7, hinge 9 and string means 13 extend in the same plane and form the strain responsive element. The butterfly sensor 5 may include holes 15 alongside hinge 9 in order to make paddles 7 more flexible. Usually holes 15 are rectangular.

As can be seen in said figure said string means 13 exist of a V-formed pair of strings, having V-bottoms arranged on the above said long sides, and the V-ends arranged on said support means 11.

Typically said sensors or sensor devices may have dimensions of approximately 1000 μm long, 200 μm wide and 8 μm thick. The dimensions would vary according to the sensor responses desired. They are made from amorphous silicon, polycrystalline silicon, single crystal silicon, or even from suitable metals. Recesses, holes, and further relief features are obtained, for example, by etching or deposition techniques which are well known to those skilled in the art. Additionally, the top surface of the butterfly sensor may be coated to enhance reflection and/or heat absorption. Preferably, Tubular housings 2 (tubes) and sensor means I are made from the same material. Usually said sensors are addressed as micromachined silicon sensors.

While only a so-called butterfly sensor device 5 is shown, a plurality of further sensor embodiments is known from the literature as discussed previously. Especially beam type sensor devices are investigated widely.

Returning to FIG. 1, as can be seen in said figure, the butterfly sensor 5 is coupled to support means 11 which in turn is connected to a leverage construction 17 connected with the above said frits 3 to the housing 2 and enabling advantageous activation of the butterfly sensor 5. In this arrangement strain affecting variations are transferred through the tubular housing 2 to the leverage construction 17 which in turn influences strain geometry in the string means 13 (as shown in FIG. 2).

Besides the above leverage construction, support means can also form a well known console-means which are arranged upon and connected to, i.e. mostly integrally formed with, an end wall of said tubular housing. In that case said end wall functions as a diaphragm for transferring said outside parameter conditions.

As will be clear to those skilled in the art, the sensor devices, as mentioned above, borrow their action on creating strain variations in their strain responsive element which is effected by means of the string means shown. Thus, in principle, any strain related parameter can be sensed by such a sensor device. Evident examples of such parameters are pressure and temperature. Further examples may be flow, vibration, displacement which is kinematically related to flow and vibration, and pressure fluctuations caused by passing chemical interfaces or fluctuating chemical conditions. In a further embodiment of the present invention, it is possible to evacuate the tubular housing to optimize vibration of the strain responsive elements.

In order to operate such a sensor device, it is well known to use both electrical and optical activation and interrogation. Especially the optical method is preferred because the use of one light beam covers both activation and interrogation and reduces circuitry complexity of such detector and sensor systems substantially. Preferably, optical fibers are used for guiding light signals and creating a relatively narrow beam irradiating the sensor device.

For the sensor device in accordance with the present invention, in principal, all kinds of fibers can be used i.e. single mode, multimode, graded index, step index, related to corresponding fiber diameters, for example from 4 μm to 1000 μm. However, preferably, single mode fiber is used where ambient temperature could result in migration of the doping material used for graded index fiber optic cable.

As known from the literature, these sensor devices have a set of vibrational modes. Since the geometry and mechanics of said modes have to be distinguished clearly as to number and position of for example their node-axes, they can be referred to as $M_{nm}$, as shown in the previously cited article by Andres et al. However different mode characterizations can be used and are per se strictly related to the above $M_{nm}$. A proper knowledge of the vibrational shape or mode is required to optimize the sensor system. If both optical integration and excitation are used (as will be discussed hereinafter), the vibrational shape (mode) determines the location of points for the optimum interrogation and activation, and is particularly critical if both functions have to be performed by only one optical fiber.

In the present invention in particular $M_{02}$ and $M_{04}$ (using the before mentioned Andres article nomenclature and also referred to therein in illustrations as the third and sixth mode), are activated. FIGS. 3a, 3b, 3c, and 3d are side cross sectional views of the butterfly sensor of FIG. 2 showing the approximate vibrational shapes for oscillation resonate modes $M_{02}$ and $M_{04}$. FIGS. 3a and 3b shows butterfly sensor 5 activated in the $M_{02}$ mode with dashed side view 18 showing the inactivated position. In FIG. 3a hinge 9 is in the maximum downward position and in FIG. 3b, the hinge 9 is in its maximum upward position. FIGS. 3c and 3d shows butterfly sensor 5 activated in the $M_{04}$ mode with dashed side view 20 showing the inactivated position. In FIG. 3c hinge 9 is in the maximum downward position and in FIG. 3d, the hinge 9 is in its maximum upward position.

As is well known to those skilled in the art, optical activation and interrogation can be carried out in different ways. Principally irradiating the sensor by means of a beam of light induces temperature gradients causing strain variations. In the case of irradiating by means of a non-continuous wave beam having a non-continuous intensity, said strain variations cause oscillations. Dependent on the frequency of said light intensity variations, resonance frequencies can be excited, and dependent on the resulting oscillation of the sensor, light is reflected correspondingly. Thus from the reflected beam, as modified by said oscillations, resonance frequency modes are detected, and consequently said resonance frequencies are measured.

For said activation well known intensity variations like block pulse, sinusoidal, or saw-tooth variations are used.

In preferred embodiments of this invention, for the $M_{02}$ and $M_{04}$ resonance modes, resonance frequencies respectively around 60 to 90 kHz and 170 to 210 kHz are employed. In order to cover a set of modes in one activation run, since the resonate modes vary with the parameters to which the sensor device is exposed, the frequency for the variations or modulations of the intensity of the irradiating beam of light is swept for example from 10 to 500 kHz preferably from 50 to 200 kHz.

Further to the above activation light signal, it is well known to employ a continuous-wave signal component, thereby improving detection of reflected beams. Generally intensity variations, in particular interference variations, are detected. Especially the latter case is accomplished as a fiber, which guides the above signals, is used, and the space between fiber end and sensor surface is employed as a well known resonance cavity. Generally the irradiating beam forms a spot upon the sensor device.

FIG. 4 (a perspective view) shows one embodiment for actuating the butterfly 5 sensor. The fiber optic cable 22 is located so that the irradiating beam 24 illuminates a portion of the sensor where there will be substantial vibrational movement in the $M_{02}$ and $M_{04}$ modes of actuation. For Example, in the embodiment of FIG. 4, the irradiating beam 24 forms a spot near the hinge 9 on one paddle 7. As shown in FIGS. 3a, 3b, 3c and 3d, the location for the spot will have substantial movement for vibrational modes $M_{02}$ and $M_{04}$. Other locations may be used to actuate these particular modes or other vibrational modes available from a butterfly sensor 5. By matching fiber characteristics, like diameter and direction, with sensor characteristics, like mass and width, modified intensity variations as induced by the sensor device are detected optimally.

Prior to operating, it is necessary to set, to calibrate, and to characterize some sensor features in order to use the sensor as a reliable measuring and detecting device. For example, location of the spot on the sensor device, direction of the beam of light irradiating the sensor, angle between beam or fiber axis and normal of the sensor plane, and distance between fiber end and sensor plane have to be set accurately. Especially as to outside parameter conditions, it has appeared possible to characterize relationships between said parameters and said resonance frequencies. Dependent on particular strain properties, sets of parameters are matched on said properties. In the case of detecting both pressure and temperature dependencies, at least two twofold frequency/pressure-temperature relationships have to be determined.

Figure 5A:
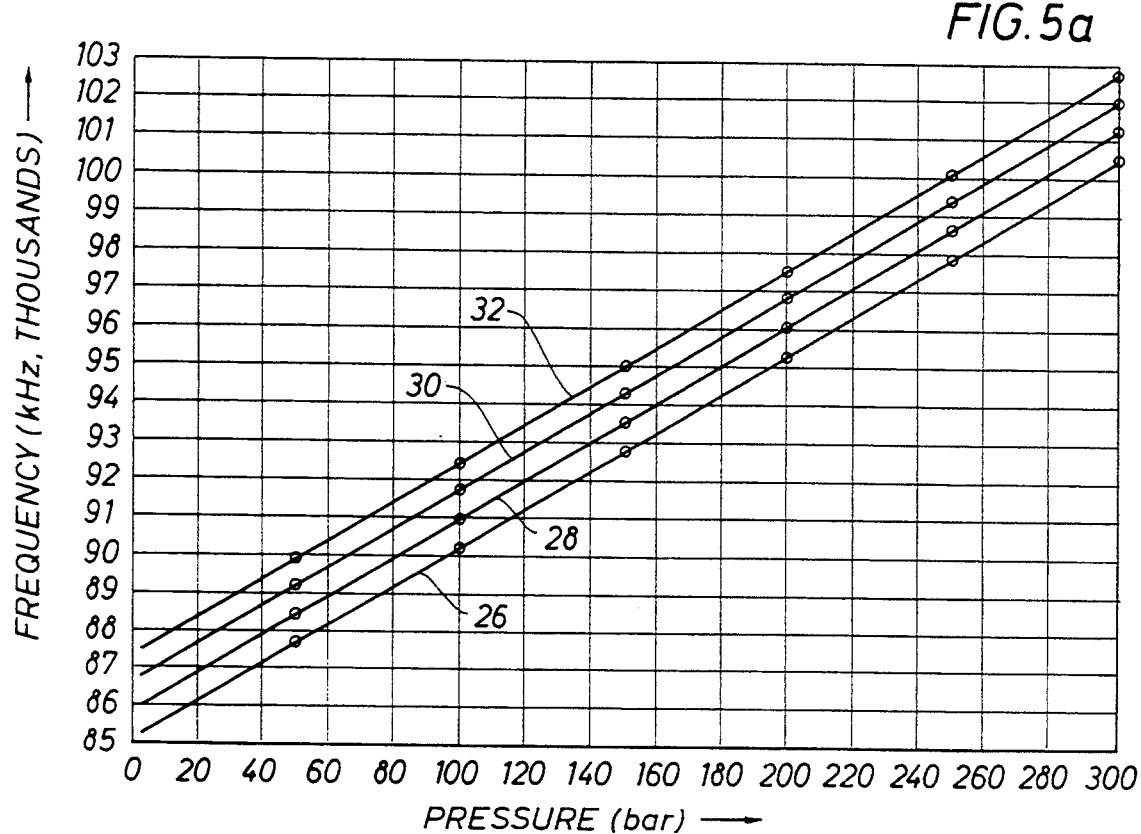
FIG. 5a and 5b are graphs showing the relationship between resonate frequency, pressure, and temperature for vibrational modes $M_{02}$ and $M_{04}$.
Figure 5B:
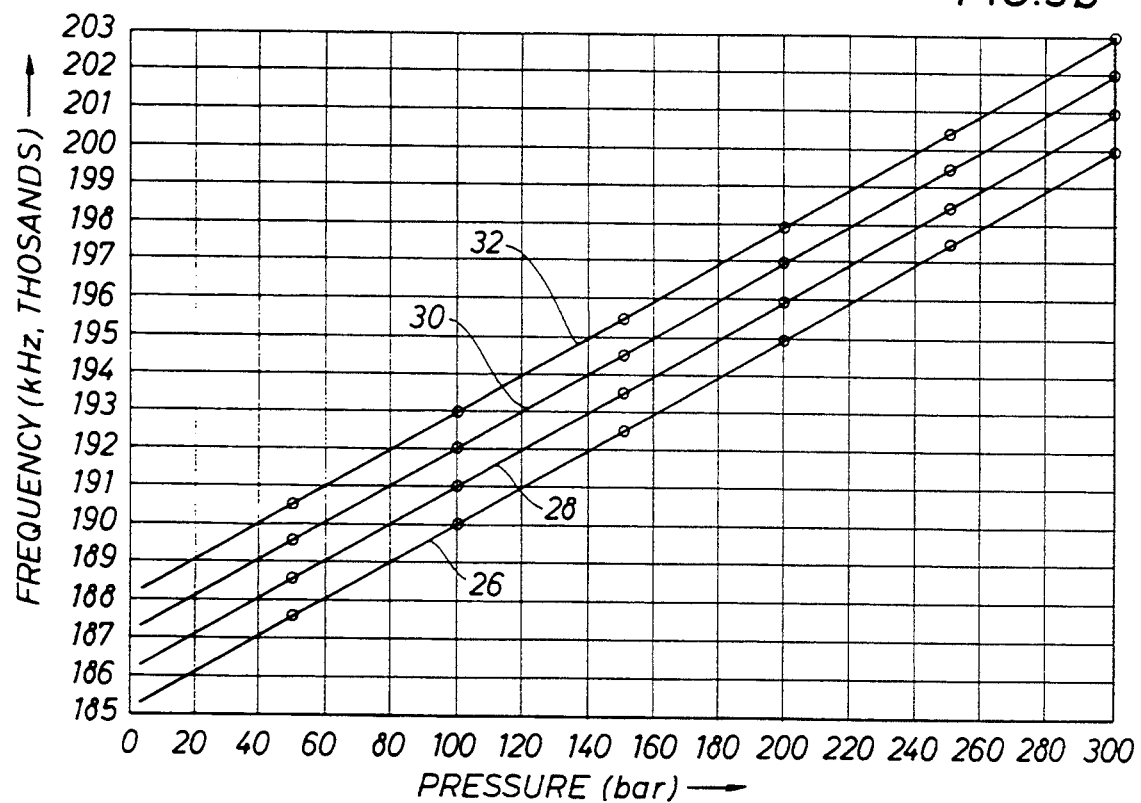

FIGS. 5a and 5b represent frequency responses (oscillation frequencies) obtained by subjecting one embodiment of the detector device of this invention to predefined parameter conditions. In this case, the predefined parameter conditions are pressure and temperature. FIGS. 5a and 5b show how the determination of two twofold frequency/pressure-temperature relationships for one sensor device mounted within a tubular housing may be obtained. FIG. 5a shows the relationship between temperature, pressure, and resonant frequency in the $M_{02}$ mode of actuation that was obtained by maintaining temperature constant and varying pressure on the tubular housing, then changing the temperature and repeating the pressure variations. FIG. 5b shows the relationship between temperature, pressure, and resonant frequency in the $M_{04}$ mode of actuation that was obtained with the same method used for FIG. 5a. The lines diagonally across FIGS. 5a and 5b for this particular sensor device represent curves fitted to data obtained at constant temperatures of approximately 0° C., 66° C., 133° and 200° C. for lines 26, 28, 30 and 32 respectively.

In accordance with the present invention, it has appeared advantageous to determine pressure and temperature characteristics for the above-mentioned $M_{02}$ and $M_{04}$ resonance modes. Said characteristics include for each resonance frequency an equation comprising specific temperature and pressure dependencies. For example, by plotting frequency characteristic data upon graphs which can show relationships between frequency and predetermined parameters, curves may be fitted to the data similar to lines 26, 28, 30, and 32 of FIGS. 5a and 5b. From these fitted curves, equations may be obtained, the equations for the curves of FIGS. 5a and 5b are:

$$\text{Mode } M_{02}F_1 = F_o + T_x(15) + P_x(52) \quad (1)$$

$$\text{Mode } M_{04}F_2 = F_o + T_x(20) + P_x(50) \quad (2)$$

Where $F_o$ is the initial resonance frequency measured for a particular mode. $T_x$ is the change in temperature and $P_x$ is the change in pressure.

Thus, $M_{02}$ for this particular detector sensor has a pressure sensitivity of 52 Hz per Bar and a temperature sensitivity of 15 Hz per ° C. Similarly, $M_{04}$ has a pressure sensitivity of 50 Hz per Bar and a temperature sensitivity of 20 Hz per ° C. Although an approximately linear relationship was found here, this relationship may not be found with other configurations which have a different crystal structure for the silicon, a different leverage arrangement or different dimensions for any component of the device because any change in the structure or composition of the device would result in different frequency responses for the predefined parameter conditions. Additionally, a larger temperature span and pressure span may be obtained for this set of data by continuing to increase temperature and pressure. It is a simple matter to design the detector device so that the exterior walls of the tubular housing are thick enough or strong enough to withstand substantial pressure. Also, the temperature characteristics of silicon are well known and increasing the ambient temperature of the detector device to temperatures well above 350° C. are well within the temperature range to which this invention is functional for measuring outside parameter conditions.

Combining the two corresponding characteristics, e.g., equations 1 and 2 of the data shown, enables deriving pressure and temperature values from the frequencies of the oscillation resonance modes detected. Thus by applying the above discussed method in accordance with the present invention pressure and temperature values respectively between approximately 0 and 2000 bar, and 0 and 350° C., preferably between 35 and 1000 bar, and 20° and 200° C., are determined.

A system for carrying out the procedures in accordance with the method of the present invention includes a light beam supply means for irradiating the strain responsive element of the micromachined sensor, a frequency oscillator means for generating a beam with frequency swept modulated intensity in order to activate said element in at least two oscillation resonance modes at their resonance frequencies, detecting means for detecting the beam of light modified by said activated element, measuring means for measuring the resonance frequencies from said modified beam, and processing means for processing resonance frequency values and deriving therefrom at least correspondingly two outside parameter values.

Advantageously the system comprises a continuous wave generating means for generating an additional continuous-wave signal component.

Figure 6:
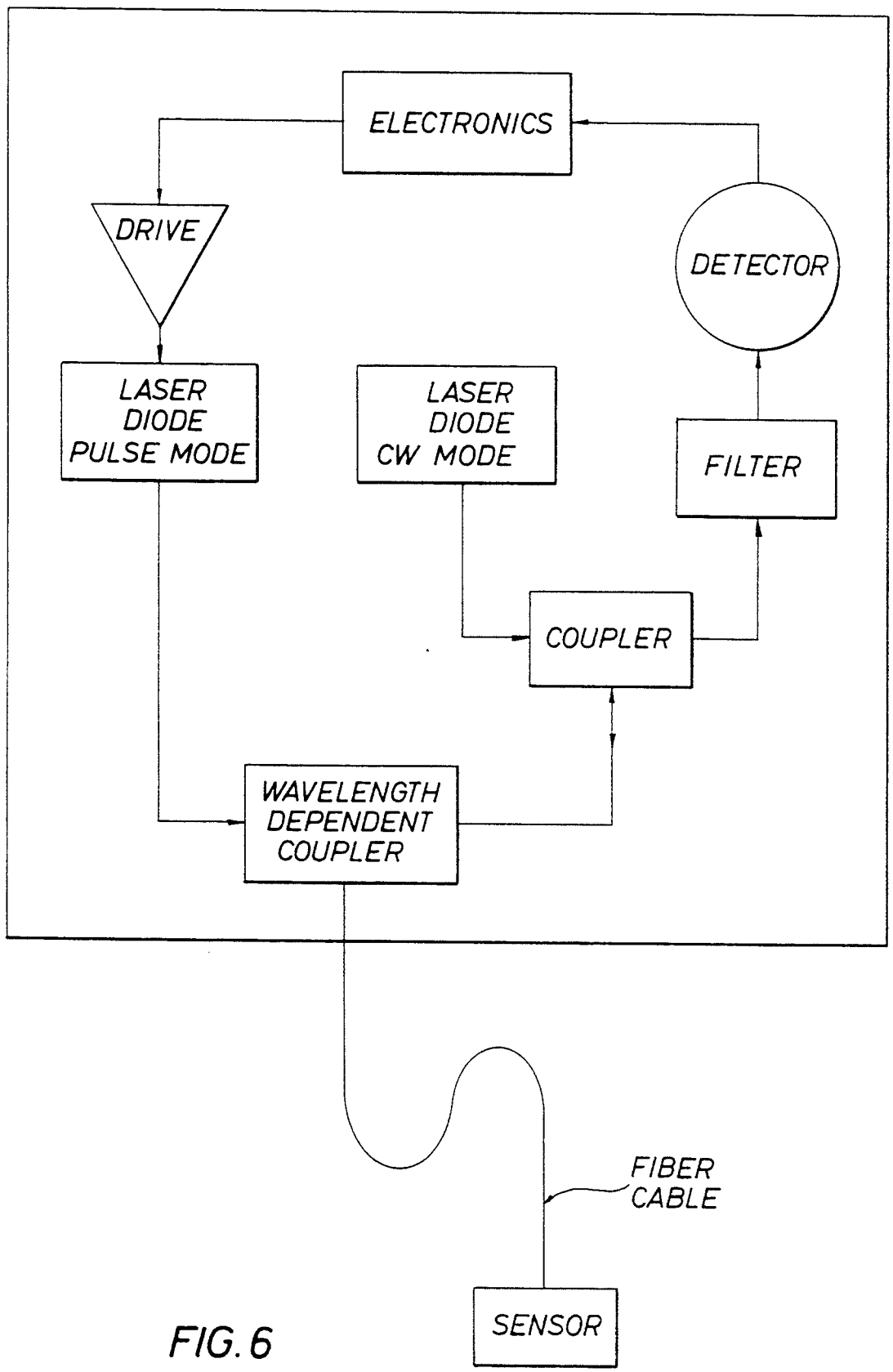
FIG. 6 is an electrical/optical block diagram of one embodiment used for actuation of the sensor and signal detection.

FIG. 6 is an electrical/optical block diagram of one preferred embodiment used to actuate the sensor and detect signals. The excitation source is a high powered laser diode emitting at 1550 nm. For the detection a continuous emitting laser diode at 1300 nm is used and in one preferred embodiment the emitting diode has a sufficient coherence length (0.5 mm) so that coherence detection may be used. Coherence detection is achieved by combining the optical fiber end and the resonator (the butterfly) into a Fabry-Perot interferometer (part of the light reflected at the fiber end interferes with light reflected from the resonator). A coherent laser diode is required for this preferred embodiment with a coherent laser length on the order of 0.4 to 2 mm. The gap between the fiber and the resonator has to be adapted to the coherence length and to the spectral output of the detection laser such that light phase changes will result in the largest intensity changes (50–100 μm is the optimum gap in the embodiment having the dimensions stated earlier).

In the embodiment of FIG. 6, each laser has single mode pigtails for coupling light efficiently into single mode optical fibers. The light from the continuous wave laser source goes through a coupler and is then combined with the excitation source into a single mode fiber by using a wavelength dependent coupler. The single mode fiber is connected to the sensor and the sensor is placed within a borehole where outside parameter conditions are to be determined.

On the detecting side, the detector is interfaced through a coupler and an optical bandpass filter. The bandpass filter transmits the 1300 nm light and attenuates any spurious 1550 nm light.

Within the electronics section, the detector output is fed to the input portion of a phase locked loop, the phase locked loop includes a voltage controlled oscillator as part of a laser modulation circuit which drives the excitation laser in a pulse mode. At the input of the phase locked loop is a phase detector which detects a difference between the phase of the voltage controlled oscillator frequency and the input frequency to the phase locked loop. The phase detector includes a phase shifter which provides a voltage that adjusts the frequency of the voltage controlled oscillator to the same frequency as the input frequency to the phased locked loop. This compensates for optical and electronic delays and also enables the voltage controlled oscillator to settle in on a resonance frequency from the sensor. Preferably, the shifter is based on digital phase compensations as analog electronics introduce large frequency dependent phase shifts. The laser modulation circuit drives the excitation laser in a pulse mode at the voltage controlled oscillator frequency. A sinusoidal pulsed excitation of the excitation laser is preferred over a block pulsed excitation since it provides the most efficient coupling to the sensor resonator.

The resonance frequency representing the measurand is determined in the electronics section by taking the output of the phase locked loop to a frequency counter. The frequency is then sent to a computer having predetermined calibration curve data. The electronics section (under the direction of the computer) then directs the voltage controlled oscillator to sweep for the resonance frequency of the next vibrational mode. When found, that frequency is also sent to the computer. The computer then processes the two oscillator resonance modes with the predefined parameter conditions stored with the computer to determine the parameters of interest which in this case is pressure and temperature.

In the experiments carried out with one sensor as configured in FIG. 2 the following operation conditions were used:

(1) pulsed mode laser diode, wave length 1550 nm,
(2) continuous-wave mode laser diode, wave length 1300 nm,
(3) spot location of the irradiating beam is alongside one of the holes (as shown in FIG. 4),
(4) the angle of the fiber axis with respect to normal is angle 1° and
(5) the distance between the fiber end and the paddle surface is 100 μm.

With respect to the before mentioned configuration, it is noted that at least 60% of the beam light energy should arrive on the paddle, more advantageously at least 80%.

Furthermore, it has appeared that the angle of the fiber axis with respect to normal should be less than 5, and preferably less than 2°. Additionally the distances between fiber end and paddle surface should lie in the range from 20 to 200 μm, preferably from 50 to 150 μm, to give advantageous parameter values.

In the above conditions, the sensor device had resonance frequencies of around 62 kHz and 173 kHz respectively for the $M_{02}$ and the $M_{04}$ mode. Temperature and pressure values, respectively between 20° and 100° C. and up to 200 bar were determined from $M_{02}$ and $M_{04}$ resonance frequencies. Errors in said values did not exceed 0.1° C. and 0.1 bar.

By applying the above method and system it has appeared possible to monitor conditions in hostile environments reliably and accurately which is of great interest, especially with regard to safety requirements.

Various modifications of the present invention will become apparent to those skilled in the art from the foregoing description and accompanying drawings. Some modifications are intended to fall within the scope of the appended claims.

What is claimed:

1. A method for monitoring strain variations of a strain responsive element of a micromachined sensor device, the method comprising the steps of:
    (a) irradiating said element by a beam of light with at least frequency swept modulated intensity for activating said element such that at least two oscillation resonance modes are activated subsequently at their resonance frequencies;
    (b) determining frequency characteristics of said device when subjected to predefined parameter conditions by measuring the corresponding resonance frequencies of two said resonance modes at said predefined parameter conditions;
    (c) determining correspondingly two parameter values for said device by fitting the measured resonance frequencies upon the corresponding frequency characteristics;
    (d) subjecting said element to outside parameter conditions; and
    (e) detecting the beam of light after being modified correspondingly by said activated element.

2. The method as claimed in claim 1, wherein the sensor device is a silicon sensor.

3. The method as claimed in claim 1, wherein the strain responsive element is a butterfly sensor, which comprises at least two rectangular paddles arranged in line and at their mutually facing short sides connected to each other by means of a hinge, each paddle at its two long sides coupled to a support means by means of at least corresponding two string means, with the paddles, the hinge and the string means extending in the same plane and forming the strain responsive element.

4. The method as claimed in claim 3, wherein said string means exist of a V-formed pair of strings, the V-bottoms of each said pair of strings arranged on said long sides of said paddles, and the V-ends of each said pair of strings arranged on said support means.

5. The method as claimed in claim 4, wherein the sensor device is arranged within a tubular housing which is subjected to said outside parameter conditions transferred to said device through said support means.

6. The method as claimed in claim 5, wherein said support means forms a console-means, the console-means being arranged upon and connected to an end wall of said housing, the end wall operating as a diaphragm for said outside parameter conditions.

7. The method as claimed in claim 5, wherein said support means are a part of a leverage construction, said construction being connected to the cylindrical wall of said housing for transferring said outside parameter conditions.

8. The method as claimed in claim 5 wherein the beam of light is supplied through an optical fiber.

9. The method as claimed in claim 8, wherein the beam of light irradiating the butterfly sensor is focussed to a spot upon one of said paddles.

10. The method as claimed in claim 8, wherein the beam of light irradiating said element also includes a continuous-wave signal component.

11. The method as claimed in claim 8 wherein both pressure and temperature values are determined.

12. The method as claimed in claim 8 wherein pressure and temperature values are determined, respectively between 0 and 2000 bar and 0° and 350° C.

13. The method as claimed in claim 8, wherein pressure and temperature values are determined, respectively between 35 and 1000 bar and 20° and 200° C.

14. The method as claimed in claim 8 wherein pressure and temperature values are determined under borehole conditions.

15. The method as claimed in claim 8, wherein the $M_{02}$ and $M_{04}$ oscillation resonance modes are activated on the butterfly sensor by the beam of light.

16. The method as claimed in claim 15, wherein the intensity of the beam of light is modulated such that the frequency swept modulated intensity of said beam is swept between 10 and 500 kHz.

17. The method as claimed in claim 15, wherein the beam of light irradiating the butterfly sensor is focussed to a spot upon one of said paddles, the major part of the spot being localized alongside the hinge.

18. The method as claimed in claim 15, wherein the beam of light irradiating said element also includes a continuous-wave signal component.

19. The method as claimed in claim 15 wherein both pressure and temperature values are determined.

20. The method as claimed in claim 15 wherein pressure and temperature values are determined, respectively between 0 and 2000 bar and 0° and 350° C.

21. The method as claimed in claim 15, wherein pressure and temperature values are determined, respectively between 35 and 1000 bar and 20° and 200° C.

22. The method as claimed in claim 15 wherein pressure and temperature values are determined under borehole conditions.

23. An apparatus for monitoring outside parameter conditions, the apparatus comprising:
 a micromachined sensor device having a strain responsive element, said strain responsive element responding to strain variations resulting from the varying outside parameter conditions;
 a light beam supply means functional for irradiating said element with light;
 a frequency oscillator means functional for generating a beam of light with frequency swept modulated intensity in order to activate said element in at least two oscillation resonance modes at their resonance frequencies, whereby the oscillator means supplies the beam supply means with an intensity modulated light beam;
 detecting means functional for detecting a modified beam of light, said modified beam being light modified by said activated element;
 measuring means functional for measuring the resonance frequencies from said modified beam; and
 processing means functional for processing resonance frequency values and deriving therefrom at least correspondingly two outside parameter values.

24. The apparatus as claimed in claim 23, further comprising:
 a continuous-wave means functional for generating an additional light beam, said continuous-wave light beam having a different wavelength than said intensity modulated light beam whereby the continuous-wave means supplies the beam supply means with a continuous-wave light beam; and
 wherein the detecting means is functional for detecting a modified continuous-wave light beam after the continuous-wave light beam is modified by the activated element.

25. The apparatus as claimed in claim 23, wherein the sensor device is a silicon sensor.

26. The apparatus as claimed in claim 23, wherein the strain responsive element is a butterfly sensor, having at least two rectangular paddles arranged in line and at their mutually facing short sides connected to each other by means of a hinge, each paddle at its two long sides coupled to a support means by means of at least corresponding two string means, with the paddles, the hinge and the string means extending in the same plane and forming the strain responsive element.

27. The apparatus as claimed in claim 23, wherein said string means exist of a V-formed pair of strings, the V-bottoms of each said pair of strings arranged on said long sides of said paddles, and the V-ends of each said pair of strings arranged on said support means.

28. The apparatus as claimed in claim 27, also comprising:
 a tubular housing, the sensor device being arranged within the tubular housing whereby the tubular housing is functional to be subjected to the outside parameter conditions whereby the conditions are transferred to the support means of the sensor device through the tubular housing.

29. The apparatus as claimed in claim 28, wherein said support means forms a console-means, the console-means being arranged upon and connected to an end wall of the housing, whereby the end wall operates as a diaphragm for transferring said outside parameter conditions to the element.

30. The apparatus as claimed in claim 29, wherein said support means are a part of a leverage construction, the leverage construction being connected to the cylindrical wall of the tubular housing for transferring said outside parameter conditions to the element.

31. The apparatus as claimed in claim 29 wherein the light beam supply means includes an optical fiber.

32. The apparatus as claimed in claim 29, wherein the light beam supply means includes a means for locating the light irradiating the butterfly sensor whereby the light is focused to a spot upon one of the paddles, the major part of the spot being localized alongside of the hinge.

33. The apparatus as claimed in claim 29 wherein the butterfly sensor is functional to be actuated in vibrational modes $M_{02}$ and $M_{04}$ for measuring the resonance frequencies of the modified beam.

34. The apparatus as claimed in claim 33, wherein the frequency oscillator means includes a means for varying the frequency swept modulated intensity of said intensity modulated beam between 10 and 500 kHz.

* * * * *